United States Patent [19]

Sano et al.

[11] Patent Number: 4,910,257

[45] Date of Patent: Mar. 20, 1990

[54] POLYETHYLENE RESIN COMPOSITION

[75] Inventors: Akira Sano, Kawasaki; Motohiko Yoshizumi; Hiroki Hirata, both of Omiya; Kazuo Matsuura, Tokyo; Hisahiko Suyama, Yokohama, all of Japan

[73] Assignees: Nippon Oil Company, Limited; Mitsubishi Metal Corporation, both of Tokyo, Japan

[21] Appl. No.: 324,600

[22] Filed: Mar. 16, 1989

[30] Foreign Application Priority Data

Mar. 18, 1988 [JP] Japan ................................. 63-63171

[51] Int. Cl.$^4$ ..................... C08L 23/28; C08L 23/18; C08L 23/16; C08L 23/04
[52] U.S. Cl. ................................... 525/192; 525/240; 525/334.1
[58] Field of Search ............. 525/192, 199, 240, 334.1

[56] References Cited

U.S. PATENT DOCUMENTS 3,125,547  3/1964  Blatz ..................................... 525/199
3,704,439  11/1987  Yamaoka et al. ................. 525/334.1
4,753,995  6/1988  Chu et al. ............................. 525/199

*Primary Examiner*—Carman J. Seccuro
*Attorney, Agent, or Firm*—Dilworth & Barrese

[57] ABSTRACT

A polyethylene resin composition comprising: (A) 50–99.9 parts by weight of an ethylene polymer; and (B) 0.1–50 parts by weight of a modified ethylene-$\alpha$-olefin copolymer obtained by fluorinating an ethylene-$\alpha$-olefin copolymer having the following properties (i) to (iv), said ethylene-$\alpha$-olefin copolymer being prepared by copolymerizing ethylene with an $\alpha$-olefin having 3 to 12 carbon atoms in the presence of a catalyst comprising a solid catalyst component and an organoaluminum compound, said catalyst component containing at least magnesium and titanium:

| | | |
|---|---|---|
| (i) | Melt index | 0.01–100 g/10 min |
| (ii) | Density | 0.860–0.910 g/cm$^3$ |
| (iii) | Maximum peak temperature (Tm) as measured according to differential scanning calorimetry (DSC) | not lower than 100° C. |
| (iv) | Boiling n-hexane insolubles content | not lower thnn 10 wt. % |

7 Claims, No Drawings

POLYETHYLENE RESIN COMPOSITION

BACKGROUND OF THE INVENTION

The present invention relates to a polyethylene resin composition extremely superior in melt fluidity and more particularly to a polyethylene resin composition comprising an ethylene polymer and a fluorinated product of an ethylene-α-olefin copolymer having specific properties.

Polyethylene is widely used in various applications. Physical properties required of polyethylene differ according to uses, but moldability is an important physical property common to all applications. Good moldability permits increase of the molding speed and reduction of the power required for molding, thus leading to the improvement of productivity; besides, there will be obtained a molded article having a smooth surface, which leads to the attainment of a transparent film in the field of films.

In order to improve the moldability it is necessary to improve the melt fluidity of polymer. The fluidity can be evaluated by checking the shear rate - shear stress relation at the time of extrusion of a molten polymer from a capillary, or a shear rate (critical shear rate) at the time of occurrence of melt fracture. In general, where the fluidity of polymer is good, the critical shear rate (or stress) is high and melt fracture is difficult to occur.

Heretofore, for reducing the occurrence of melt fracture, there have been proposed methods such as, for example, the addition of various processing aids. In all of those methods, however, it is difficult to greatly or completely reduce the occurrence of melt fracture and so a further improvement has been desired.

It is therefore the object of the present invention to overcome the aforementioned drawback of the prior art.

Having made extensive studies for solving the above-mentioned problem, the present inventors found that a polyethylene resin composition extremely superior in the prevention of melt fracture could be obtained by blending an ethylene polymer with a fluorinated product of an ethylene-α-olefin copolymer having specific properties. And thus we accomplished the present invention.

More specifically, the present invention resides in a polyethylene resin composition characterized by containing:

(A) 50-99.9 parts by weight of an ethylene polymer and (B) 0.1-50 parts by weight of a modified ethylene-α-olefin copolymer obtained by fluorinating an ethylene-α-olefin copolymer having the following properties (i) to (iv), said ethylene-α-olefin copolymer being prepared by copolymerizing ethylene with an α-olefin having 3 to 12 carbon atoms in the presence of a catalyst comprising a solid catalyst component and an organoaluminum compound which solid catalyst component contains at least magnesium and titanium:

| | |
|---|---|
| (i) Melt index | 0.01-100 g/10 min |
| (ii) Density | 0.860-0.910 g/cm$^3$ |
| (iii) Maximum peak temperature (Tm) as measured according to differential scanning calorimetry (DSC) | not lower than 100° C. |
| (iv) Boiling n-hexane insolubles content | not lower thnn 10 wt. % |

The present invention will be described below in more detail.

(A) Ethylene Polymer

As the ethylene polymer, component (A), in the present invention there may be used a known ethylene polymer. Usually, an ethylene polymer having a melt index (as measured under the conditions of 190° C., 2.16 kg according to JIS K6760, hereinafter referred to as "MI") of 0.01 to 100 g/10 min, preferably 0.01 to 50 g/10 min and a density of 0.910 to 0.970 g/cm$^3$, is used. Examples of the ethylene polymer as referred to herein include, in addition to ethylene homopolymer, ethylene copolymers prepared by copolymerizing ethylene with not more than about 10 mol % of α-olefins of $C_3$ to $C_{12}$ such as propylene, butene-1, 4-methylpentene-1 and hexene-1. For example, mention may be made of those called high-density polyethylene, low-density polyethylene by a high pressure process, and linear low-density polyethylene.

(B) Modified Ethylene-α-Olefin Copolymer

The modified ethylene-α-olefin copolymer used as component (B) in the present invention is obtained by fluorinating an ethylene-α-olefin copolymer having specific properties, which ethylene-α-olefin copolymer is prepared by copolymerizing ethylene with an α-olefin in the presence of a catalyst comprising a solid catalyst component and an organoaluminum compound, the solid catalyst component containing at least magnesium and titanium. As the α-olefin there may be used one having 3 to 12, preferably 3 to 6, carbon atoms. Examples are propylene, butene-1, 4-methylpentene-1, hexene-1, octene-1, decene-1 and dodecene-1. Among them, propylene, butene-1, 4-methylpentene-1 and hexene-1 are particularly preferred. Dienes such as, for example, butadiene, 1,4-hexadiene, vinyl norbornene and ethylidene norbornene may also be used as comonomers. The α-olefin content of the ethylene-α-olefin copolymer is preferably 5-40 mol %, more preferably 8-30 mol %.

The catalyst system used comprises a solid catalyst component and an organoaluminum compound, the solid catalyst component containing at least magnesium and titanium. For example, the solid catalyst component is obtained by supporting a titanium compound on an inorganic solid compound containing magnesium by a known method. Examples of magnesium-containing inorganic solid compounds include, in addition to metal magnesium, magnesium hydroxide, magnesium carbonate, magnesium oxide, magnesium chloride, as well as double salts, double oxides, carbonates, chlorides and hydroxides, which contain magnesium atom and a metal selected from silicon, aluminum and calcium, further, these inorganic solid compounds after treatment or reaction with oxygen-containing compounds, sulfur-containing compounds, aromatic hydrocarbons or halogen-containing substances.

As examples of the above oxygen-containing compounds are mentioned water and organic oxygen-containing compounds, such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thioethers and the like, and inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound, mention may be made of halides, alkoxyhalides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is $0 \leq n \leq 4$, such as, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitaium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of trivalent titanium compounds are mentioned titanium trihalides such as titanium tetrachloride and titanium tetrabromide reduced with hydrogen, aluminum, titanium or an organometallic compound of a Group I-III metal in the Periodic Table, as well as trivalent titanium compounds obtained by reducing tetravalent alkoxytitanium halides of the general formula $Ti(OR)_mX_{4-m}$ with an organometallic compound of a Group I-III metal in the Periodic Table in which formula R is an alkyl, aryl or aralkyl group having 1 to 20 carbon atoms, X is a halogen atom and m is $0 < m < 4$. Tetravalent titanium compounds are particularly preferred.

As preferred examples of catalyst systems are mentioned combinations of organoaluminum compounds with such solid catalyst components as $MgO-RX-TiCl_4$ (Japanese Patent Publication No. 3514-1976), $Mg-SiCl_4-ROH-TiCl_4$ (Japanese Patent Publication No. 23864/1975), $MgCl_2-Al(OR)_3-TiCl_4$ (Japanese Patent Publication Nos. 152/1976 and 15111/1977), $MgCl_2-SiCl_4-ROH-TiCl_4$ (Japanese Patent Laid Open No. 106581/1974), $Mg(OOCR)_2-Al(OR)_3-TiCl_4$ (Japanese Patent Publication No. 11710/1977), $Mg-POCl_3-TiCl_4$ (Japanese Patent Publication No. 153/1976), $MgCl_2-AlOCl-TiCl_4$ (Japanese Patent Publication No. 15316/1979) and $MgCl_2-Al(OR)_nX_{3-n}-Si(OR')_mX_{4-m}-TiCl_4$ (Japanese Patent Laid Open No. 95909/1981), in which formulae R and R' are each an organic radical and X is a halogen atom.

As other examples of catalyst systems are mentioned combinations of organoaluminum compounds with reaction products as solid catalyst components obtained by the reaction of organomagnesium compounds such as so-called Grignard compounds with titanium compounds. Examples of organomagnesium compounds are those of the general formulae RMgX, $R_2Mg$ and RMg(OR) wherein R is an organic radical having 1 to 20 carbon atoms and X is a halogen atom, and ether complexes thereof, as well as modified compounds obtained by modifying these organomagnesium compounds with other organometallic compounds such as, for example, organosodium, organolithium, organopotassium, organoboron, organocalcium and organozinc.

More concrete examples of such catalyst systems are combinations of organoaluminum compounds with such solid catalyst components as $RMgX-TiCl_4$ (Japanese Patent Publication No. 39470/1975), $RMgX-phenol-TiCl_4$ (Japanese Patent Publication No. 12953/1979), RMgX-halogenated phenol-$TiCl_4$ (Japanese Patent Publication No. 12954/1979) and $RMgX-CO_2-TiCl_4$ (Japanese Patent Laid Open No. 73009/1982).

As still other examples of catalyst systems are mentioned combinations of organoaluminum compounds with solid products obtained by contacting such inorganic oxides as $SiO_2$ and $Al_2O_3$ with the solid catalyst component containing at least magnesium and titanium. In addition to $SiO_2$ and $Al_2O_3$ there also may be mentioned CaO, $B_2O_3$ and $SnO_2$ as examples of inorganic oxides. Double oxides thereof are also employable without any trouble. For contacting these inorganic oxides with the solid catalyst component containing magnesium and titanium, there may be adopted a known method. For example, both may be reacted at a temperature of 20° to 400° C. preferably 50° to 300° C., usually for 5 minutes to 20 hours, in the presence or absence of an inert solvent, or both may be subjected to a co-pulverization treatment, or there may be adopted a suitable combination of these methods.

As more concrete examples of such catalyst systems, mention may be made of combination of organoaluminum compounds with $SiO_2-ROH-MgCl_2-TiCl_4$ (Japanese Patent Laid Open No. 47407/1981), $SiO_2-R-O-R'-MgO-AlCl_3-TiCl_4$ (Japanese Patent Laid Open No. 187305/1982) and $SiO_2-MgCl_2-Al(OR)_3-TiCl_4-Si(OR')_4$ (Japanese Patent Laid Open No. 21405/1983) in which formulae R and R' are each a hydrocarbon radical.

In these catalyst systems the titanium compounds may be used as adducts with organocarboxylic acid esters, and the magnesium-containing inorganic solid compounds may be used after contact treatment with organic carboxylic acid esters. Moreover, the organoaluminum compounds may be used as adducts with organocarboxylic acid esters. Further, the catalyst systems may be prepared in the presence of organic carboxylic acid esters.

As organic carboxylic acid esters there may be used various aliphatic, alicyclic and aromatic carboxylic acid esters, preferably aromatic carboxylic acid esters having 7 to 12 carbon atoms. Examples are alkyl esters such as methyl and ethyl of benzoic, anisic and toluic acids.

As preferred examples of the organoaluminum compound to be combined with the solid catalyst component are mentioned those represented by the general formulae $R_3Al$, $R_2AlX$, $RAlX_2$, $R_2AlOR$, RAl(OR)X and $R_3Al_2X_3$ wherein Rs, which may the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloirde, and mixtures thereof.

The amount of the organoaluminum compound used is not specially limited, but usually it is in the range of 0.1 to 1,000 mols per mol of the titanium compound.

The polymerization reaction is carried out in the same manner as in the conventional olefin polymerization reaction using a Ziegler type catalyst. More particularly, the reaction is performed in a substantially oxygen- and water-free condition in vapor phase or in the presence of an inert solvent or using monomer per se as solvent. Olefin polymerizing conditions involve temperatures in the range of 20° to 300° C., preferably 40° to 200° C., and pressures in the range from normal pressure to 70 kg/cm$^2$·G, preferably 2 kg/cm$^2$G or 60 kg/cm$^2$·G. The molecular weight can be adjusted to some extent by changing polymerization conditions such as polymerization temperature and catalyst mol ratio, but the addition of hydrogen into the polymerization system is more effective for this purpose. Of course, two or more multi-stage polymerization reactions involving different polymerization conditions such as different hydrogen concentrations and different polymerization temperatures can be carried out without any trouble. Among them, the vapor phase polymerization is preferable.

The melt index (MI measured at 190° C. and 2.16 kg, according to JIS K 6760) of the ethylene-α-olefin copolymer thus prepared is in the range of 0.01 to 100 g/10 min, preferably 0.1 to 50 g/10 min. Its density (according to JIS K 6760) is in the range of 0.860 to 0.910 g/cm$^3$, preferably 0.870 to 0.905 g/cm$^3$ and more preferably 0.880 to 0.900 g/cm$^3$. Its maximum peak temperature (Tm) measured according to a differential scanning calorimetry (DSC) is not lower than 100° C., preferably not lower than 110° C. Its insolubles in boiling n-hexane are not less than 10 wt. %, preferably 20-95 wt. % and more preferably 30-90 wt. %.

If the melt index of the ethylene-α-olefin copolymer is less than 0.01 g/10 min, the fluidity will be deteriorated. And if it exceeds 100 g/10 min, the mechanical strength will be reduced. A density thereof lower than 0.860 g/cm$^3$ would result in surface stickiness of the fluorinated product thereof and lowering of mechanical strength. A density exceeding 0.910 g/cm$^3$ is not desirable, because it would cause deterioration of flexibility and low temperature characteristics. A maximum peak temperature thereof as measured according to DSC of lower than 100° C. is not desirable, either, because it would result in surface stickiness of the modified copolymer and reduced resistance to heat. If the proportion of insolubles in boiling n-hexane is smaller than 10 wt. %, the amount of a sticky component would be increased, resulting in sticky and lowering of mechanical strength.

Insolubles in boiling n-hexane and DSC were measured in the following manner.

[How to Determine Insolubles in Boiling n-Hexane]

A 200 μm thick sheet is formed using a hot press, from which are then cut out three sheets each 20 mm long by 30 mm wide. Using these sheets, extraction is made in boiling n-hexane for 5 hours by means of a double-tube type Soxhlet extractor. n-Hexane insolubles are taken out and vacuum-dried (50° C., 7 hours), then the percentage insolubles (C$_6$ insoluble) in boiling n-hexane is calculated in accordance with the following equation:

$$\text{Insolubles in boiling n-hexane (wt. \%)} = \frac{\text{Weight of extracted sheet}}{\text{Weight of unextracted sheet}} \times 100 \text{ (wt. \%)}$$

[Measurement by DSC]

A hot-pressed 100 μm thick film as a specimen is heated to 170° C. and held at this temperature for 15 minutes, followed by cooling to 0° C. at a rate of 2.5° C./min. Then, from this state the temperature is raised to 170° C. at a rate of 10° C./min and measurement is made. The vertex position of the maximum peak of peaks appearing during the heat-up period from 0° to 170° C. is regarded as the maximum peak temperature (Tm).

The method for fluorinating the ethylene-α-olefin copolymer thus prepared is not specially limited. But, preferably, a powder or pellets of the copolymer are reacted with a gaseous mixture of fluorine gas and an inert gas such as, for example, helium or argon. Or there may be used a method wherein a fluorine compound such as ammonium fluoride is blended with the copolymer in advance and then heating is made up to a temperature at which the fluorine compound will decompose and liberate fluorine, allowing the liberated fluorine with the copolymer.

The fluorine content of the thus-fluorinated ethylene-α-olefin copolymer is about 0.1-50 wt. %, preferably about 0.5-30 wt. %, more preferably about 1-20 wt. %.

[Blending]

The polyethylene resin composition of the present invention is obtained by blending the thus-obtained ethylene polymer (A) and modified ethylene-α-olefin copolymer (B) together.

The blending ratio of the components (A) and (B) is, in terms of component (A) : component (B), 50-99.9 : 0.1-50 parts by weight, preferably 70-99 : 1-30 parts by weight, more preferably 80-98 : 2-20 parts by weight.

As the blending method there may be adopted any known method. Typical examples are mechanical melt-kneading methods using uni- and biaxial extruders, Bumbury's mixer, various kneaders, and rolls. There also may be used a method wherein the components are blended by being dissolved in a solvent.

In such mechanical melt-kneading methods, the blending operation is performed usually at a temperature in the range of 150° to 300° C. And additives, e.g. antioxidant, may be added as necessary before, after or at the time of the blending.

The polyethylene resin composition of the present invention obtained in the manner described above is extremely superior in the prevention of melt fracture at a high shear rate, thus permitting a high-speed molding; besides, it can afford molded articles having smooth surfaces. Particularly, the composition of the invention exhibits high moldability in extrusion, so that when formed into film by inflation or T-die extrusion, the film is greatly improved in its utility value, having an extremely high transparency.

The following examples are given to illustrate the present invention more concretely, but it is to be understood that the invention is not limited thereto.

EXAMPLE 1

(a) Preparation of Modified Ethylene-α-Olefin Copolymer (I)

An ethylene-butene-1 copolymer was prepared by copolymerizing ethylene and butene-1 using a catalyst comprising a solid catalyst component and triethylaluminum, the solid catalyst component having been obtained using substantially anhydrous magnesium chloride, 1,2-dichloroethane and titanium tetrachloride.

The ethylene-butene-1 copolymer thus obtained had a butene-1 content of 11.4 mol %, an MI of 0.41 g/10 min, a density of 0.897 g/cm$^3$, a maximum peak temperature according to DSC of 120° C. and a boiling n-hexane insolubles content of 87 wt. %.

Then, a modified ethylene-butene-1 copolymer (I) was obtained by fluorinating the ethylene-butene-1 copolymer with a gaseous mixture fluorine/argon =25/75 (volume ratio) at 90° C. for 1 hour.

The modified copolymer exhibited a weight increase of 11.3% as compared with the copolymer weight before the fluorine treatment. In terms of the fluorine content in the modified copolymer such weight increase corresponds to about 10 wt. %.

(b) Preparation of Polyethylene Resin Composition 98 parts by weight of a linear low-density polyethylene (trade name: Nisseki LINIREX AF1210, a product of Nippon Petrochemicals Co., Ltd.) [component (A)] having an MI of 0.8 g/10 min and a density of 0.920 g/cm$^3$ and 2 parts by weight of the modified copolymer obtained in (a) [component (B)] were mixed thoroughly and then pelletized using an extruder having an inside diameter of 50 mm and a screw L/D ratio of 26 at 200° C.

(c) Melt Fluidity Test

The pellets thus obtained were placed in the cylinder portion of a capillary rheometer, a product of Instron Co., equipped with a die having a diameter of 0.0301 inch and a length of 1.0059 inches and held at 190° C. for 10 minutes, then extruded at the same temperature and at six stages of extrusion speeds of 0.06, 0.2, 0.6, 2, 6 and 20 cm/min. Shear rates at those extrusion speeds were 16.3, 54.3, 162.8, 542.5, 1628 and 5425 sec$^{-1}$, respectively. The extrudates at those extrusion speeds were checked for surface state and melt fracture to find that no melt fracture was observed up to the extrusion speed 20 cm/min (shear rate: 5425 sec$^{-1}$).

EXAMPLE 2

A polyethylene resin composition was prepared in the same way as in Example 1(b) except that there were used 97 parts by weight of a high-density polyethylene (trade name: Nisseki Staflene E809(M), a product of Nippon Petrochemicals Co., Ltd.) having an MI of 0.9 g/10 min and a density of 0.950 g/cm$^3$ in place of the linear lowdensity polyethylene [component (A)] as well as 3 parts by weight of the modified copolymer obtained in Example 1(a). Then, using the polyethylene resin composition thus prepared, a melt fluidity test was conducted in the same manner as in Example 1(c). As a result, no melt fracture was observed up to the extrusion speed of 20 cm/min (shear rate: 5425 sec$^{-1}$)

EXAMPLE 3

A polyethylene resin composition was prepared in the same way as in Example 1(b) except that there were used 99 parts by weight of a low-density polyethylene (trade name: Nisseki Rexlon F22, a product of Nippon Petrochemicals Co., Ltd.) having an MI of 1.0 g/10 min and a density of 0.924 g/cm$^3$ in place of the linear low-density polyethylene [component (A)] as well as 1 part by weight of the modified copolymer obtained in Example 1(a). Then, using the polyethylene resin composition thus obtained, a melt fluidity test was conducted in the same manner as in Example 1(c). As a result, no melt fracture was observed up to the extrusion speed of 20 cm/min (shear rate: 5425 sec$^{-1}$).

EXAMPLE 4

Fluorination was performed in the same way as in Example 1(a) except that the composition ratio of the fluorine-argon gaseous mixture was changed to fluorine/argon =40/60 (volume ratio) to obtain a modified ethylene-butene-1 copolymer (II). This modified copolymer exhibited a weight increase of 13.1% as compared with the copolymer weight before the fluorine treatment. The fluorine content of the modified copolymer was about 12 wt. %.

A polyethylene resin composition was prepared in the same way as in Example 1(b) except that in place of the component (A)/component (B) weight ratio of 98/2 there was used a weight ratio of component (A)/the modified copolymer just prepared above of 99/1. Then, using the polyethylene resin composition thus prepared, a melt fluidity test was conducted in the same manner as in Example 1(c). As a result, no melt fracture was observed up to the extrusion speed of 20 cm/min (shear rate: 5425 sec$^{-1}$).

EXAMPLE 5

(a) Preparation of Modified Ethylene-α-Olefin Copolymer (III)

An ethylene-propylene copolymer was prepared by copolymerizing ethylene and propylene using a catalyst comprising a solid catalyst component and triethylaluminum, the solid catalyst component having been obtained using substantially anhydrous magnesium chloride, anthracene and titanium tetrachloride. The ethylene-propylene copolymer thus prepared had an ethylene content of 88.0 mol %, an MI of 1.0 g/10 min, a density of 0.901 g/cm$^3$, a maximum peak temperature according to DSC of 121° C. and a boiling n-hexane insolubles content of 79 wt. %.

A modified ethylene-propylene copolymer (III) was obtained by fluorinating the above ethylene-propylene copolymer with a gaseous mixture of fluorine and argon (fluorine/argon =25/75) at 90° C. for 1 hour. The modified copolymer exhibited a weight increase of 9.4% as compared with the copolymer weight before the fluorine treatment. The fluorine content of the modified copolymer was about 9 wt. %.

(b) Preparation of Polyethylene Resin Composition

A polyethylene resin composition was prepared in the same way as in Example 1(b) except that in place of the component (A)/component (B) weight ratio of 98/2 there was used a weight ratio of component (A)/the modified copolymer just prepared above of 95/5.

(c) Melt Fluidity Test

The polyethylene resin composition was tested for melt fluidity in the same manner as in Example 1(c). As a result, no melt fracture was observed up to the extrusion speed of 20 cm/min (shear rate: 5425 sec$^{-1}$).

EXAMPLE 6

Fluorination was performed in the same way as in Example 1(a) except that the fluorination time was changed to 5 minutes, to obtain a modified ethylene-butene-1 copolymer (IV). This modified copolymer exhibited a weight increase of 2.0° as compared with the copolymer weight before the fluorination treatment. The fluorine content thereof was about 2.0 wt. %.

A polyethylene resin composition was prepared in the same manner as in Example 1(b) except that in place of the component (A)/component (B) weight ratio of 98/2 there was used a weight ratio of component (A)/the modified copolymer just prepared above of 80/20. Then, using the polyethylene resin composition thus obtained, melt fluidity test was conducted in the same manner as in Example 1(c). As a result, no melt fracture was observed up to the extrusion speed of 20 cm/min (shear rate: 5425 sec$^{-1}$).

COMPARATIVE EXAMPLE 1

A polyethylene resin composition was prepared in the same way as in Example 1(b) except that in place of the modified copolymer [component (B)], the ethylene-butene-1 copolymer obtained in Example 1(a) was used as it was (unmodified) without being subjected to fluorination. Then, using the polyethylene resin composition thus prepared a melt fluidity test was conducted in the same manner as in Example 1(c). As a result, melt fracture was observed at the extrusion speed of 2.0 cm/min (shear rate: 542.5 sec$^{-1}$).

COMPARATIVE EXAMPLE 2

With only the linear low-density polyethylene used in Example 1(b), a melt fluidity test was conducted with the result that melt fracture was observed at the extrusion speed of 2.0 cm/min (shear rate: 542.5 sec$^{-1}$).

COMPARATIVE EXAMPLE 3

A polyethylene resin composition was prepared in the same way as in Example 2 except that in place of the modified copolymer obtained in Example 1(a), the ethylene-1-butene copolymer prepared in Example 1(a) was used as it was (unmodified) without being subjected to fluorination. Then, using the polyethylene resin composition thus prepared, a melt fluidity test was conducted in the same manner as in Example 2 with the result that melt fracture was observed at the extrusion speed of 0.6 cm/min (shear rate: 162.8 sec$^{-1}$).

COMPARATIVE EXAMPLE 4

With only the high-density polyethylene used in Example 2, a melt fluidity test was conducted. As a result, melt fracture was observed at the extrusion speed of 0.6 cm/min (shear rate: 162.8 sec$^{-1}$).

COMPARATIVE EXAMPLE 5

A polyethylene resin composition was prepared in the same way as in Example 3 except that in place of the modified copolymer obtained in Example 1(a), the ethylene-1-butene copolymer prepared in Example 1(a) was used as it was (unmodified) without being subjected to fluorination. Then, using the polyethylene resin composition thus prepared, a melt fluidity test was conducted in the same manner as in Example 3. As a result, melt fracture was observed at the extrusion speed of 6.0 cm/min (shear rate: 1628 sec$^{-1}$).

COMPARATIVE EXAMPLE 6

With only the low-density polyethylene used in Example 3, a melt fluidity test was conducted. As a result, melt fracture was observed at the extrusion speed of 6.0 cm/min (shear rate: 1628 sec$^{-1}$).

The results obtained above are as tabulated below as Table 1.

TABLE 1

| | Component (A) | Component (B) | Component (A)/Component (B) (weight ratio) | Shear Rate Causing Melt Fracture (sec$^{-1}$) |
| --- | --- | --- | --- | --- |
| Example 1 | Linear low-density polyethylene | Modified copolymer (I) | 98/2 | 5425 |
| Example 2 | High-density polyethylene | Modified copolymer (I) | 97/3 | 5425 |
| Example 3 | Low-density polyethylene | Modified copolymer (I) | 99/1 | 5425 |
| Example 4 | Linear low-density polyethylene | Modified copolymer (II) | 99/1 | 5425 |
| Example 5 | Linear low-density polyethylene | Modified copolymer (III) | 95/5 | 5425 |
| Example 6 | Linear low-density polyethylene | Modified copolymer (IV) | 80/20 | 5425 |
| Comparative Example 1 | Linear low-density polyethylene | Unmodified copolymer (I) | 98/2 | 542.5 |
| Comparative Example 2 | Linear low-density polyethylene | not used | 100/0 | 542.5 |
| Comparative Example 3 | High-density polyethylene | Unmodified copolymer (I) | 97/3 | 162.8 |
| Comparative Example 4 | High-density polyethylene | not used | 100/0 | 162.8 |
| Comparative Example 5 | Low-density polyethylene | Unmodified copolymer (I) | 95/5 | 1628 |
| Comparative Example 6 | Low-density polyethylene | not used | 100/0 | 1628 |

What is claimed is:

1. A polyethylene resin composition characterized by containing:
   (A) 50–99.9 parts by weight of an ethylene polymer; and
   (B) 0.1–50 parts by weight of a modified ethylene-α-olefin copolymer obtained by fluorinating an ethyelen-α-olefin copolymer having the following properties (i) to (iv), said ethylene-α-olefin copolymer being prepared by copolymerizing ethylene with an α-olefin having 3 to 12 carbon atoms in the presence of a catalyst comprising a solid catalyst component and an organoaluminum compound, said solid catalyst component containing at least magnesium and titanium:

| | | |
|---|---|---|
| (i) | Melt index | 0.01–100 g/10 min |
| (ii) | Density | 0.860–0.910 g/cm$^3$ |
| (iii) | Maximum peak temperature (Tm) as measured according to differential scanning calorimetry (DSC) | not lower than 100° C. |
| (iv) | Boiling n-hexane insolubles content | not lower than 10 wt. % |

2. A polyethylene resin composition as set forth in claim 1, wherein the ethylene polymer (A) has a density in the range of 0.910 to 0.970 g/cm$^3$.

3. A polyethylene resin composition as set forth in claim 1, wherein the modified ethylene-α-olefin copolymer (B) has an α-olefin content in the range of 5 to 40 mol %.

4. A polyethylene resin composition as set forth in claim 3, wherein the α-olefin has 3 to 6 carbon atoms.

5. A polyethylene resin composition as set forth in claim 1, wherein the modified ethylene-α-olefin copolymer (B) has a fluorine content in the range of about 0.1% to about 50% by weight.

6. A polyethylene resin composition as set forth in claim 1, wherein the modified ethylene-α-olefin copolymer (B) has a fluorine content in the range of about 1% to about 20% by weight.

7. A polyethylene resin composition as set forth in claim 1, wherein the ratio of the ethylene polymer (A) to the modified ethylene-α-olefin copolymer (B) is 80–98 parts by weight : 2–20 parts by weight.

* * * * *